Aug. 17, 1965 W. H. BLASHFIELD 3,201,523

P.B.X TRUNK CIRCUIT FOR RESTRICTOR

Filed Nov. 20, 1961

2 Sheets-Sheet 1

INVENTOR.
WILLIAM H. BLASHFIELD
BY Brown, Jackson, Boettcher & Dienner

P.B.X TRUNK CIRCUIT FOR RESTRICTOR

Filed Nov. 20, 1961 2 Sheets-Sheet 2

AUTOMATIC TRUNK

INVENTOR.
WILLIAM H. BLASHFIELD
BY Brown, Jackson, Boettcher & Dienner

United States Patent Office 3,201,523
Patented Aug. 17, 1965

3,201,523
P.B.X TRUNK CIRCUIT FOR RESTRICTOR

William H. Blashfield, Galion, Ohio, assignor to North Electric Company, Galion, Ohio, a corporation of Ohio Filed Nov. 20, 1961, Ser. No. 153,404
19 Claims. (Cl. 179—27)

The present invention is directed to an automatic telephone system, and more particularly to an automatic telephone system which includes a novel trunk circuit arranged for use with a private branch exchange (P.B.X).

The present invention includes a novel trunk circuit suitable for intercoupling the trunk of a P.B.X with a restrictor circuit such as that disclosed in Patent No. 2,875,286, entitled "Telephone Call Survey Equipment," issued February 24, 1959, and assigned to the assignee of this invention. Inasmuch as operation of the restrictor circuit and associated circuits will be apparent from the disclosure of such patent, the explanation of the present invention will be directed to the trunk circuit and its interconnection with the previously-disclosed circuitry.

A P.B.X is normally connected to provide service between stations served by the P.B.X and also to extend connections from the P.B.X stations to stations in the associated city exchange and any stations reached over free service trunks through the city exchange. It is customary to have a certain level (digit) in the P.B.X assigned for use by the P.B.X stations for the selection of an idle one of a group of trunk circuits leading to the associated city exchange. If the city exchange accessible to the P.B.X has direct distance dialing facilities, certain calling parties may attempt to use the P.B.X level to extend long distance calls through the associated city exchange without identifying the calling subscriber. From a practical standpoint therefore it is necessary to provide a protective arrangement in certain private branch exchanges which prevents access by P.B.X stations through the associated city exchanges to certain remote toll offices.

In certain arrangements, therefore, a restrictor circuit is connected for access by the trunk circuit, and is operative to examine the call-routing digits in each call transmitted by the stations at the P.B.X for the purpose of determining whether the call is being attempted in the direction of a "restricted" or an "unrestricted" office. In the event that the call is being directed toward a restricted office, the restrictor operates to prevent the extension of the call and further to return busy tone or a recorded message to the calling station; or alternatively to route the call to an intercept operator.

In certain restrictor arrangements now in the field, however, the restrictor operation has not been sufficiently comprehensive to prevent calling parties from surmounting the protective barrier of the restrictor. That is, a calling party may initially dial the call-routing digits of an unrestricted office, and thereby extend the connection beyond the restrictor equipment to the unrestricted or allowed office. Once the call has thus been extended beyond the restrictor equipment to the unrestricted office, momentary jiggling of the hook on the telephone substation may effect release of the connection in the associated city exchange without dropping the trunk, whereupon the call re-lands in the associated city exchange and the calling party is free to dial the call-routing digits of a number representing a restricted exchange to route the call through the associated city exchange to the restricted office.

It is therefore a primary object of the present invention to provide means for more reliably preventing a P.B.X station from extending connections past a restrictor unit to a restricted office.

It is a particular object of the invention to provide a novel circuit arrangement which includes means operative to initiate trunk release in response to a brief disconnection by the calling party, and means in the trunk for preventing release of the P.B.X circuitry until the elapse of a further time period, whereby the city connection will have sufficient time to release before the trunk is free to accept another call.

Another problem which is experienced in such arrangements is the provision of a protective means that will limit the dialing time available to a calling party. That is, unless the dialing time is of a limited period, it is possible for the calling party to dial a station in the associated city exchange which the calling party has reason to believe will not be answered and, by waiting until the equipment in the city exchange automatically times out releasing the connection and allowing the trunk to re-land, to complete a call to an unrestricted office since the connection has been extended past the restrictor portion of the system. A similar condition occurs if the associated city equipment "times out" before the party has completed dialing, or if the calling station holds the connection until time-out after the called party in the associated city exchange has restored his handset.

Another object of the invention therefore includes the provision of a novel timing of the dialing period, and particularly a timing arrangement having a common control which permits adjustment in a simple and expeditious manner of the permitted dialing time of all the trunks of an exchange.

The foregoing and other objects of the invention are attained by a novel trunk circuit which includes a timing circuit having a unijunction transistor. The dialing time is controlled by a source of timing pulses, a timing relay, the unijunction transistor, and an RC circuit. Dialing time is adjusted by varying the rate of discharge of the RC circuit, as explained hereinafter. The unijunction transistor provides a circuit which operates independently of fluctuations in supply voltage, and which is extremely versatile in permitting the adjustment of the dialing time throughout a wide time interval.

In many prior art arrangements, it has been the practice in passing the call-routing dial pulses from the P.B.X system to the restrictor equipment to utilize blocking capacitors and battery feed relays in the trunk repeating incoming dial pulses to the switching circuits connected therewith. Such arrangement inherently includes the problem of possible distortion of the dial pulses by the blocking capacitors, which may cause errors in the extension of calls toward desired subscriber lines.

According to a feature of the present invention, the novel trunk circuit includes a straight-thru, metallic-line path which extends from the P.B.X to the associated city exchange with a novel high-impedance circuit bridged between the tip and ring conductors of the trunk to "pick off" the dial pulses thereby permitting the transmission of any type of signal between the P.B.X and the city exchange. The circuit follows dial pulses with extreme accuracy in installations having (*a*) city trunk resistances of several thousand ohms, (*b*) P.B.X extension line resistances of up to a thousand ohms, (*c*) as many as ten bridged ringers on the line, and (*d*) leakages as low as a few thousand ohms. Further, the dialing circuit is not adversely affected by high transient voltages, and does not produce false signals with opening of the trunk circuit at the called office. In a preferred embodiment of the invention, protection against false signals of such type is obtained by effectively blocking the transistor portion of the dialing circuit from conduction to prevent reoperation of the dialing relay before the P.B.X selector is released.

The features of the present invention which are believed to be novel are set forth with particularity in the appended claims. The invention itself, together with further objects and advantages thereof, may best be understood by reference to the following description taken in connection with the accompanying drawings, in the several figures of which like reference numerals identify like elements, and in which:

GENERAL ARRANGEMENT OF TELEPHONE SYSTEM

Figure 1:
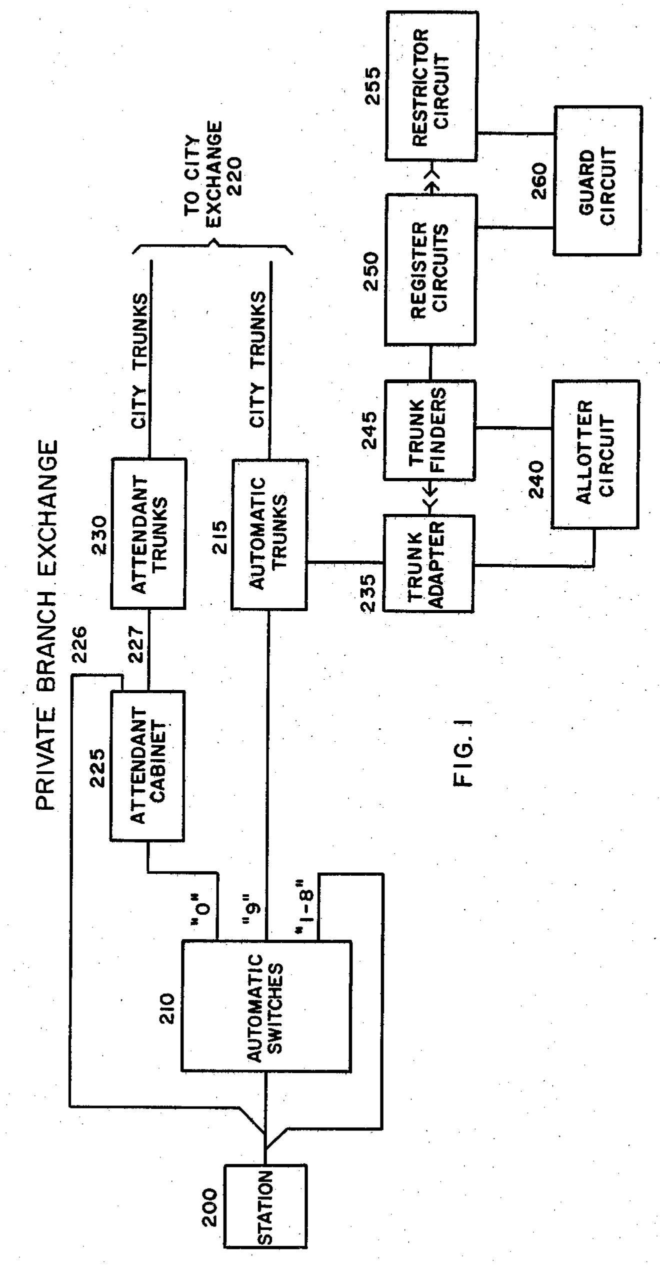
FIGURE 1 is a simplified block diagram of a portion of an automatic telephone system including a P.B.X.

A general switching arrangement for an automatic telephone system including a P.B.X is illustrated schematically in block form in FIGURE 1. As there shown, a private branch exchange is adapted to serve a number of stations, one of which is illustrated generally at 200, and includes switching means, such as illustrated automatic switches 210, for extending communicating connections between stations of the private branch exchange, as well as connections from such stations over automatic trunks 215 to stations reached through an associated city exchange 220. In the illustrated arrangement, levels "1–8" of the switching equipment in the P.B.X have been assigned for use by the stations in establishing calls to other stations local to the P.B.X; level "9" has been assigned for use in obtaining access to automatic trunks 215; and level "0" has been assigned for use in reaching the attendant at cabinet 225.

A calling party at a station of the private branch exchange extends a connection to the attendant at attendant cabinet 225 by dialing the digit "0" in the conventional manner. As the attendant is reached, the call may be extended by the attendant over a path, such as 227, to the atendant trunks 230 associated with city exchange 220.

Calls incoming to the private branch exchange from stations in the city exchange 220 may be extended over the attendant trunks 230 to the attendant's position 220. The attendant in turn extends the calls over paths, such as 226, to the desired party in the P.B.X.

As indicated heretofore, known restrictor arrangements include equipment which allows stations of a P.B.X to extend connections to certain predetermined offices, and prevents access by stations of the P.B.X to remote toll offices. If a P.B.X party at illustrated station 200 desires to extend a connection to a station in an allowed office, he dials the digit 9; and then dials the number of the desired party.

As the calling party dials the digit "9," an automatic trunk circuit, such as 215, is seized in the conventional manner, and the trunk in "turn" lands in the city exchange and seizes a city exchange link. Simultaneously the automatic trunk, such as illustrated unit 215, prepares the restrictor equipment for operation.

Figure 2:
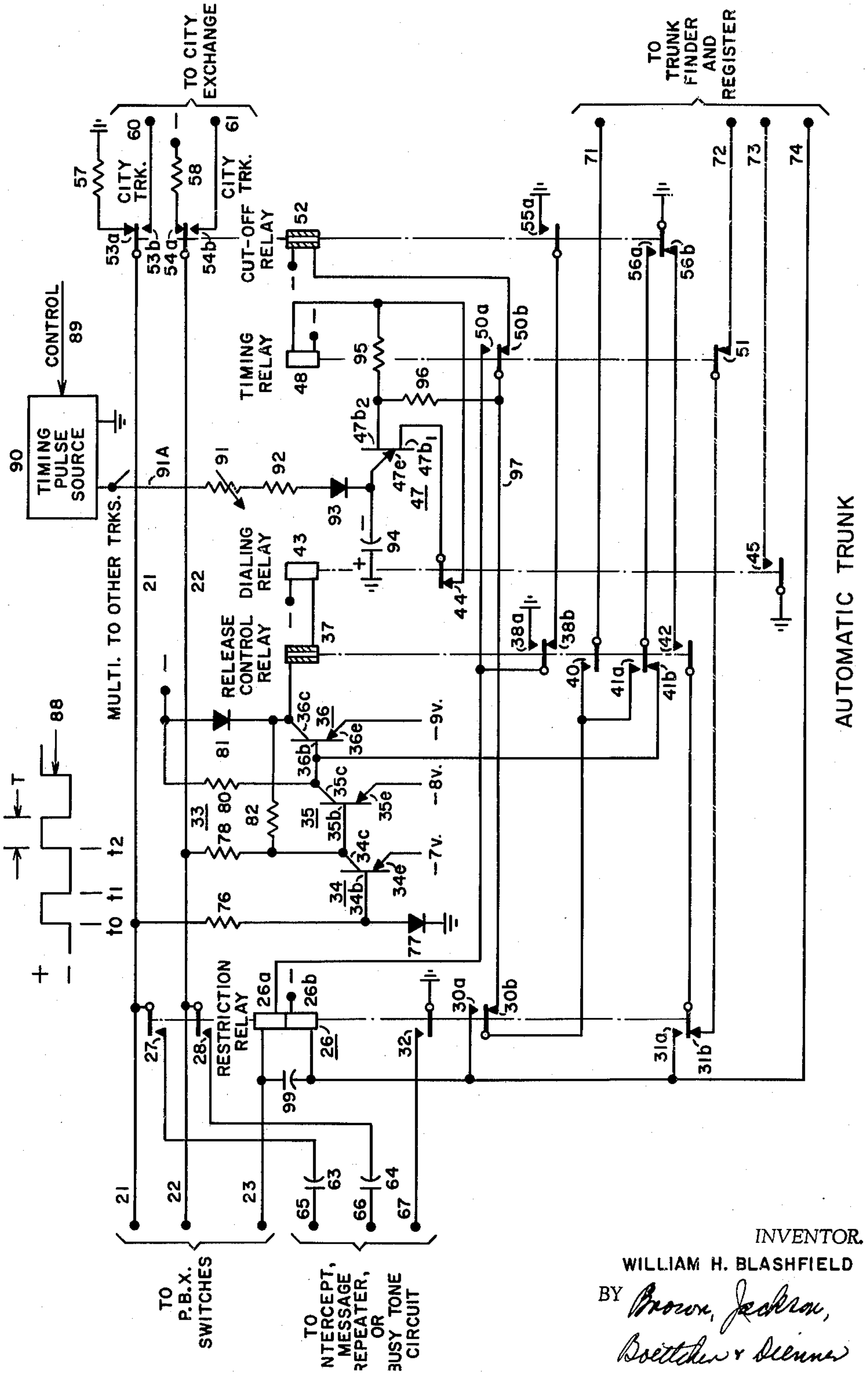
FIGURE 2 is a schematic diagram of an automatic trunk in which the inventive arrangement has been incorporated.

Briefly, the restrictor equipment may include a number of trunk adapter or line circuits, such as illustrated trunk adapter 235, each of which is associated with and permanently tied to a different one of the automatic trunks, such as 215; a lesser number of trunk finders, such as illustrated trunk finder 245; a plurality of register circuits, such as illustrated register circuit 250, each of which is permanently associated with a different one of the finders 245; allotter circuit 240 for allotting the trunk finders for use in a predetermined sequence; a restrictor circuit, such as illustrated circuit 255 which is accessible to the register circuit 250; and a guard circuit 260 for preventing more than one register from seizing the restrictor circuit at the same time. As a practical matter, it has been found that in many existing installations, the trunk circuit represented by block 215 is comprised of two or three relays, and an adapter, such as represented by block 235, may require six or seven relays. As a result the novel circuit shown in FIGURE 2, has been adapted for insertion in lieu of the existing trunks. Thus, the circuit shown in FIGURE 2 is represented by the two separate blocks 215, 235 in FIGURE 1.

As the automatic trunk, such as 215, is seized by a calling station, it is operative to energize its associated circuit 235, which in cooperation with the allotter circuit 240 effects seizure of an idle one of the trunk-finders 245 which finds the trunk 215 and trunk adapter 235, and extends the same into an associated register circuit, such as the illustrated register circuit 250.

As the calling party at station 200 dials the first three digits of the called number (either the area code or office code), impulses representative of the digits are transmitted over the seized one of the automatic trunks to the city exchange 220, and also to the seized register circuit 250.

Register circuit 250 registers the three digits on associated register sets, and as the third digit is registered, the register seizes the restrictor circuit 255. Restrictor circuit 255 has access to a number of sets of terminals, one set of terminals being assigned to represent the value of the first digit of the three-digit code, and a second set of terminals being assigned to represent the second and third digits. Strapping of a terminal in the first set to one in the second set establishes the full code that is to be nonrestricted. Thus, if terminal "2" is tied to terminal "47," code "247" is permitted. If not so tied, the code will be blocked.

As a register, such as 250, seizes restrictor 255, the code (area or office) registered in register 255 by the calling party is extended to the restrictor which automatically selects the terminal associated with the called code, and returns an indication back to register 250 as to the restricted or nonrestricted nature of the code. The register 250 extends a signal over the trunk finder 245 and trunk adapter 235 to the automatic trunk 215 to indicate to the trunk as to whether the call should be allowed to progress or whether the equipment should be released.

A detailed operational description of the manner in which the system including the restrictor equipment is operative to restrict calls to certain offices and to permit the extension of other calls is set forth in Patent No. 2,875,286. The connections of the novel trunk circuit to such equipment and the manner of operation of the trunk circuit with the restrictor are now set forth in detail.

The novel circuit of FIGURE 2, as noted above, replaces the automatic trunk, such as that referenced by numeral 215 in FIGURE 1, and the trunk adapter which is referenced by numeral 235. Connections from the P.B.X selector, included in the block designated "Automatic Switches 210" in FIGURE 1, are made to input conductors 21, 22 and 23; conductor 21 being the tip conductor, conductor 22 the ring conductor, and conductor 23 the test conductor which is connected to winding 26a of a two-winding restriction relay 26. Other major components of the novel adapter include a dial pulse transmission circuit having a transistor circuit 33, a release control relay 37 and a dialing relay 43; a timing circuit 46 including a unijunction transistor 47 and a timing relay 48; and a cut-off relay 52.

In the illustrated position of the contacts of cut-off relay 52, ground potential is applied over resistor 57 and contacts 53a to tip conductor 21, and negative battery is applied over resistor 58 and contacts 54a to ring conductor 22. With operation of relay 52, the potential thus applied to the tip and ring conductors is removed and the tip and ring conductors 21 and 22 are coupled over conductors 60 and 61 of the corresponding city trunk.

The detailed operations of the various circuit elements of FIGURE 2 will be described hereinafter. For the present it is noted that restriction relay 26 at its contacts 32 controls a start circuit for associated equipment, such as a message repeater or busy tone circuit, or intercept circuit, which may be used in the system, and at contacts 27 and 28 controls the connection of the signal output of the associated equipment over conductors 65, 66 and capacitors 63, 64 to tip and ring conductors 21 and 22 and the calling station.

The remaining connections between the novel restrictor trunk adapter and the associated circuits are provided over conductors 71–74, which afford intercoupling between the trunk circuit and conventional trunk-finder and register circuitry as shown, for example, in Patent No. 2,875,286. Conductor 72 is utilized to extend ground potential to the "start" lead of the register; for example, to start lead 284 in FIGURE 2 of the above-identified patent. Extension of such potential causes an idle register to commence hunting for the trunk. As the trunk is found, ground potential is extended from the register (e.g., from contact 270–1 in FIGURE 2 of the above-identified patent) to conductor 71 of the novel restrictor trunk adapter, to effect operation of cut-off relay 52 as will be described hereinafter. Output conductor 73 is utilized to transmit ground-potential impulses representative of the called number, and would be connected to contact number 1 of the first trunk-finder; for example, to contact 265–1 in FIGURE 2 of the above-identified patent. Output conductor 74, connected within the novel restrictor trunk circuit to operating winding 26*b* of restriction relay 26, is extended to the associated trunk-finder circuitry, and in FIGURE 2 of the above-identified patent, would be connected to contact 260–1 of trunk-finder 145. With this teaching of the intercoupling of the novel restrictor trunk circuit to the associated equipment, novel circuit arrangements of the restrictor trunk adapter itself will now be described.

DETAILED DESCRIPTION OF THE INVENTION

A. *Transistorized dialing circuit*

The novel dialing circuit 33 of the invention including transistors 34–36 functions to pick of call-routing impulses from the communication path including tip and ring conductors 21 and 22, and to amplify such impulses, while exhibiting a high impedance to avoid unduly loading the trunk circuit. The amplified impulses are transmitted to associated control means (dialing relay 43) which is operated in response to receipt of an impulse from the transistor circuit. In its operation dialing relay 43 at its contacts 45 produces pulse signals for transmission over conductor 73 to associated register equipment as explained above.

In more detail, the transistorized portion of the novel dialing circuit includes three PNP type transistors, each having an emitter *e*, a base *b* and a collector *c*. A resistor 76 and a diode 77 are connected in series between tip conductor 21 and ground, and base 34*b* of transistor 34 is connected to the common connection of diode 77 and resistor 76. Resistor 78 is connected between ring conductor 22 and the common connection of collector 34*c* and base 35*b* of transistors 34 and 35 respectively. A resistor 80 is connected between negative battery and the common connection between collector 35*c* and base 36*b*, and a diode 81 is connected between negative battery and collector 36*c*. A feed-back resistor 82 is connected between collectors 36*c* and base 35*b* of transistors 36 and 35 respectively. Emitters of transistors 34–36 are respectively connected to terminals 85, 86, 87, which are connected to −7 v., −8 v., −9 v., respectively. In the present embodiment negative battery (−) is −48 volts.

B. *Timing circuit*

The novel timing circuit 46 comprises a unijunction transistor 47 and timing relay 48. The unijuncton transistor includes an emitter 47*e*, a first base connection $47b_1$, and a second base connection $47b_2$. The timing circuit also includes a source 90 of timing pulses connected over variable resistor 91, resistor 92, diode 93 and a capacitor 94 to ground. Emitter 47*e* of unijunction transistor 47 is connected to the common connection between diode 93 and capacitor 94. A voltage divider circuit extends from negative battery over the winding of timing relay 48, and resistors 95 and 96 to conductor 97 and thus to ground potential applied thereto as the trunk is found. Base $47b_2$ is connected to the junction of resistors 95 and 96, and base $47b_1$ is connected over contacts 44 to junction of resistor 95 and relay 48.

OPERATION OF THE INVENTION

A. *Equipment unoperated*

Prior to the seizure of the trunk circuit 215 for use in a call by a calling party at substation 200 of the P.B.X, the line loop which extends to the trunk circuit from the P.B.X over conductors 21, 22 is open, and the trunk circuit applies ground potential over resistor 57 and contacts 53*a* to tip conductor 21; and negative battery over resistor 58 and contacts 54*a* to ring conductor 22. The ground potential on conductor 21 is extended over resistor 76 to base 34*b* to reverse bias the emitter-base circuit of transistor 34 which is accordingly non-conductive.

The negative battery or −48 volts potential on conductor 22 is applied over resistor 78 to base 35*b*, and the emitter-base circuit of transistor 35 is forward-biased. In that negative battery is applied over resistor 80 to collector 35*c* of transistor 35, this transistor is on or conductive during the period in which the P.B.X line loop is open. Collector current from transistor 35 develops a voltage drop across resistor 80, which as applied to base 36*b* of transistor 36 is positive relative to the potential applied to emitter 36*e*, thus maintaining transistor 36 biased off or non-conductive under these conditions. With transistor 36 non-conductive, both release control relay 37 and dialing relay 43 are restored.

B. *Restrictor seizure and operation*

As the initial step in establishing a connection through a P.B.X trunk and over a corresponding city trunk to the city exchange, the subscriber at substation 200 (FIGURE 1) lifts the handset and dials the digit 9. The dial impulses thus produced are transmitted to automatic switches 210, which in turn are operated to seize one of the automatic trunks 215. For purposes of explanation it is assumed the seized trunk includes tip and ring conductors 21 and 22 (FIGURE 2).

As such trunk is seized the line loop is closed, and each of conductors 21 and 22 is at a potential of approximately −24 volts (assuming negligible loop resistance). As −24 volts appears on conductor 21 and, over resistor 76, at base 34*b*, the emitter-base circuit of transistor 34 is forward-biased and transistor 34 conducts to effect a collector current flow over resistor 78. The voltage applied to base 35*b* becomes more positive to produce a net reverse bias of the emitter-base circuit of transistor 35 and thereby bias transistor 35 in a non-conducting direction. As transistor 35 becomes non-conductive, the voltage drop across resistor 80 is reduced, and the voltage applied to base 36*b* of transistor 36 goes negative to produce a forward bias in the emitter-base circuit of transistor 36 and increase the conductivity thereof. Feedback resistor 82 produces a "snap" action in this circuit, for as transistor 36 begins to conduct, the voltage at collector 36*c* changes in the positive direction so that, as this voltage is applied over resistor 82 to base 35*b*, transistor 35 is swiftly cut off. The regenerative action also obtains when transistor 36 is driven from the conductive state toward cutoff, with the voltage at collector 36*c* changing in the negative direction, this negative-going potential applied over resistor 82 to base 35*b* augmenting the forward bias in the emitter-base circuit of transistor 35. Accordingly it is evident that no possible combination of line voltages can maintain transistor 36 partially conducting at some intermediate level at which its dissipation might exceed a safe rating. Transistor 36 is ether "full on" or "full off" (except, of course, for the negligible intervals of switching between the conductive and non-conductive states).

Diode 77, connected between base 34*b* and ground, protects the circuit against damage by transients or abnormally high line voltages which may appear on the trunk. If tip conductor 21 is driven negative with respect to ground potential, current flows from conductor 21 over resistor 76 and the base-emitter circuit of transistor 34. If tip conductor 21 is driven positive, current flows from ground over diode 77 and resistor 76 to conductor 21. If ring conductor 22 is driven negative, current flows from conductor 22 over resistor 78 and through the base-emitter circuit of transistor 35. If conductor 22 is driven positive, current flows from conductor 22 over resistor 78, the collector-base path of transistor 34, and over diode 77 to ground. Resistors 76 and 78 are selected to have resistance values sufficiently high so that voltages of the order of several hundred volts can produce current through these resistors only of the order of milliamperes, to ensure that the various transistors of dialing circuit 33 cannot be damaged by high transient voltages on the trunk.

Diode 81 protects transistor 36 from the effects of inductive voltage transients produced in the winding of relay 43. To ensure that the release of relay 43 is not undesirably slowed by such connection of diode 81, the coil or winding of relay 43 should have a high ratio of resistance to inductance, which can be realized by selecting a standard relay with a small number of turns and adding resistance in series therewith. Inasmuch as the copper sleeve on a slow coil affords low inductance, a slow relay can be utilized in place of a series-connected resistor. With the use of a slow coil, transistor 36 controls the operation of both release control relay 37 and dialing relay 43.

OPERATION RESPONSIVE TO TRANSMISSION OF SUBSTATION PULSES OVER TRUNK

When the P.B.X switching equipment seizes the trunk, transistor 34 is turned on, transistor 35 is turned off, and transistor 36 is rendered conductive, causing release control relay 37 and dialing relay 43 to operate. From the foregoing explanation, it is evident that the transistor circuit energizes relays 37 and 43 when the line loop is closed, and de-energizes these relays when the loop is open. Relay 37 operates and at its contacts 38*a* completes a holding circuit for the P.B.X switching equipment which extends over winding 26*a* of restriction relay 26 and input conductor 23. The level of current flow over such circuit, while sufficient to hold the switching equipment, is below the value required to operate restriction relay 26. Relay 37 at its contacts 42 simultaneously completes a start circuit which extends from ground over contacts 56*b*, 42, 31*b*, 51 to conductor 72, thus grounding the start lead 72 which causes an idle register to commence hunting for the trunk in the manner described in the above-identified patent.

As the trunk is found, the register signals this fact by applying ground potential to conductor 71, completing an energizing circuit for cut-off relay 52 which extends from negative battery over the winding of relay 52, contacts 50*b*, conductor 97, contacts 30*b* and 40 to conductor 71. Cut-off relay 52 operates, and at its contacts 56*a* completes a holding circuit which extends from negative battery over the winding of relay 52, contacts 50*b*, conductor 97, contacts 30*b*, 41*a*, and 56*a* to ground; and at its contacts 53*b* and 54*b* closes the loop to the city exchange, indicated to the P.B.X calling station by reception of city dial tone. As the calling party dials the called number dialing relay 43 (which was operated at the time of seizure of the trunk adapter circuit 235) follows the impulses and opens and closes contacts 45 to transmit corresponding impulses over conductor 73 to the register 250.

After the first three digits of the called number are dialed and registered, the register 250 by means of the guard circuit 260 engages the restrictor circuit 255. The restrictor 255 examines the three digits in the register and if it finds that these three digits represent an unrestricted office, the register drops off. In the event that the calling party has attempted to extend a call to a restricted office, the register applies ground potential to conductor 74 to complete an energizing circuit for restriction relay 26, which circuit extends from negative battery over winding 26*b* to conductor 74.

Relay 26 operates and at its contacts 27, 28 connects the subscriber line conductors 21, 22 to an intercept position, such as an attendant cabinet (or to a message repeater or busy tone circuit); at its contacts 32 extends ground potential over conductor 67 to initiate operation of the message repeater or the busy tone circuit (if included in the system) to thereby automatically inform the calling party that the call is restricted; at its contacts 30*a* completes a temporary self-holding circuit over contacts 41*a* and 56*a*; and at its contacts 30*b* interrupts the previously-described holding circuit for cut-off relay 52.

After a predetermined time interval relay 52 releases and at contacts 53*a*, 54*a* extends battery over resistors 57, 58 to the calling line conductors 21, 22; at contacts 53*b*, 54*b* interrupts the connection to the city exchange trunk; at its contacts 56*a* interrupts the temporary holding circuit for resistor relay 26; and at its contacts 56*b* completes a holding circuit for restrictor relay 26 which extends from negative battery over the lower winding of relay 26, contacts 31*a*, 42 and 56*b* to ground. When the calling party hangs up, opening of the loop results in the release of relays 37 and 43. Contacts 42 open, releasing relay 26 which restores the trunk to normal.

C. *Timing circuit*

The operation of the timing circuit as the finder seizes the trunk and grounds conductor 71 marks the beginning of an allotted dialing time during which a calling party at substation 200 is free to dial the required number of digits to extend a call over the corresponding city trunk to an allowed office. This time period may be present between 10 and 50 seconds, in a manner to be explained hereinafter. During this time, unijunction transistor 47 prepares a circuit for timing relay 48 which will be completed only with the restoration of the dialing relay 43.

In the event the calling party does not complete the dialing of the desired number prior to the expiration of the allotted dialing time, timing relay 48 operates to interrupt at its contacts 50*b* the holding circuit for cut-off relay 52, which restores and at its contacts 53*b*, 54*b* releases the city trunk. Relay 48 is also operative at contacts 51 to interrupt the circuit including start conductor 72 to prevent a finder hunting operation as contacts 56*b* are closed with restoration of cut-off relay 52, prior to release of the equipment.

The allotted time may be varied with two separate controls, one of which is in the trunk adapter itself, and the other of which is provided externally of the trunks and adapters. Thus, the first control in the trunk adapter itself can be adjusted to compensate for circuit element variations in the different trunks so that all of the trunks have approximately the same allotted dialing time, and the second or external control can then be adjusted at will to simultaneously vary the allotted dialing time in each of the automatic trunks.

The basic components of the novel timing circuit include timing relay 48 and a unijunction transistor 47, the conduction of transistor 47 being controlled by an RC discharge circuit comprising capacitor 94, resistor 92 and variable resistor 91, and timing pulse source 90.

Because various timing pulse sources can be utilized, the circuitry and operation of source 90 are set forth subsequent to the description of the timing circuit.

Capacitor 94 is charged by an initial charging current at the time power is first applied to the system and is held charged over a circuit which extends from negative battery over relay 48, contacts 44, base emitter path $47b_1$, $47e$, capacitor 94, to ground. Relay 48 may operate incidentally but will be released after the condenser becomes charged.

As a P.B.X party initiates a call over the automatic trunk, relays 37 and 43 operate as a result of extension of the calling loop into the trunk, relay 43 opening its contacts 44 and relay 37 closing its contacts 42 which causes a register to find the trunk whereupon ground is placed on conductor 71 by the register. This ground through contacts 40, 30b, conductor 97 and contacts 50b through the winding of cut-off relay 52 to negative potential, operates relay 52 which extends the P.B.X tip and ring to the trunk circuit leading to associated city exchange 220. After relay 52 operates, a series circuit through contacts 56a and 41a parallels contacts 40.

This same ground potential on conductor 97 is applied to one end of the voltage divider comprising resistors 96 and 95 and relay 48 and thence to negative potential, establishing a potential difference across resistor 95 to provide for blocking the emitter base path 47e, 47b. Thereupon condenser 94 discharges over the path from ground, condenser 94, rectifier 93, resistor 92, variable resistor 93, conductor 91a, timing pulse source 90, to ground. It should be observed that current flow over conductor 97, resistors 96 and 95 and the winding of relay 48 during such period is of insufficient value to operate relay 48 (but would be sufficient to hold relay 48 if it were operated).

As noted above, capacitor 94 had been charged previous to this blocking whereby the potential of emitter 47e was very close to the potential of base $47b_1$. When the difference potential appears between $47b_1$ and $47b_2$, the emitter-base path $47e$, $47b_1$ is conditioned to not conduct. Capacitor 94 must therefore be at least partially discharged to bias the emitter-base circuit $47e$, $47b_1$ of unijunction transistor 47 to conduct. To this end a common pulse source 90 continually "beats" ground pulses against the capacitor 94 in each of the trunk circuits, such as illustrated trunk circuit 215, providing the discharge circuit traced above. During the periods that the timing circuit was not conditioned (i.e., bases $47b_1$, $47b_2$ at the same potential) the emitter conducted at zero voltage keeping condenser 94 charged, and the "beat" pulses were without effect. However, once the timing circuit is conditioned by the register placing ground on conductor 71 as described, the path over base $47b_1$ is cut off in the manner described above and capacitor 94 is discharged for the period that each ground pulse is provided by source 90. The rate of discharge is dependent in part upon the RC product obtained with the capacitance of capacitor 94, the total resistance of resistor 92, and the effective portion of variable resistor 91, the variable resistor 91 in each trunk circuit providing a simple means for adjusting the length of timing in each trunk without varying the duration of the timing operation in the other trunks. The discharge rate can further be controlled by regulating the time duration of the signals produced by pulse source 90, a regulation referenced generally by numeral 89 in FIGURE 2 and set out hereinafter in more detail. For purposes of this explanation, it is sufficient to note that pulse source 90 produces a signal output, such as that indicated by waveform 88, with a positive-going pulse (i.e., a low resistance to ground pulse) during time T, the interval between pulses being adjustable by control 89.

In one embodiment, trunk timing (that is, the interval between the finding of the trunk and the operation of timing relay 48) was adjustable over a range of approximately 10 to 50 seconds by varying the repetition rate within source 90.

As capacitor 94 discharges over the described discharge circuit, the potential applied by this capacitor to emitter 47e of the unijunction transistor goes more positive, until it reaches the level at which unijunction transistor 47 can conduct. As the transistor 47 is thus prepared for conduction, an operating circuit is prepared for timing relay 48 which extends from negative battery over the winding of this relay, contacts 44, the emitter-base path 47e, 47b, of transistor 47, and capacitor 94 to ground. The prepared circuit is interrupted, however, as long as the dialing relay is operated and contacts 44 are held open.

The P.B.X parties, such as the party at station 200, are allotted a reasonable period of time to effect the extension of a call to an unrestricted exchange. If the subscriber has completed dialing of the desired number within the allotted time period the line loop will be closed, transistor 36 will be conducting and both release control relay 37 and dialing relay 43 are operated to hold contacts 44 of the dialing relay 43 open and no time-out will occur. Thus, if a call is extended through the city exchange to a particular called station in the allotted time period, whether or not the call is answered by the called party, timing circuit 46 does not interfere with the connection.

If the calling party for any reason whatsoever attempts to dial another number after the timing period has expired, the break period of the first dialing impulse transmitted interrupts the circuit for dialing relay 43 which restores to close contacts 44 and thereby complete the previously prepared circuit through the emitter base path $47e$, $47b_1$ whereby condenser 94 charges through the winding of relay 48. Timing relay 48 operates, and at its contacts 50a completes a holding circuit extending from negative battery over the winding of relay 48, resistors 95 and 96, contacts 50a and 38a to ground; at its contacts 50b interrupts the holding circuit for cut-off relay 52, which restores and releases the city trunk; and at its contacts 51 interrupts any possible extension of ground potential from the trunk adapter to the allotter 240.

In certain few city exchanges, if the called party hangs up before the calling party, the connection drops out and the call lands in a new link. An unprincipled calling party may arrange with another called party to have the called party lift the receiver and replace it so that the calling party may dial a restricted office through the new link in the city exchange. The timing circuit of the present invention is set to limit the dialing time so that this is not possible.

Thus, in effect, the novel timing circuit is operative to prevent initiation of a second call after a given timing period which period commences as a first call is initiated.

The use of a unijunction transistor in the timing circuit provides substantial advantages. The silicon bar which forms the base in such transistors acts somewhat as a voltage divider between the base-two and base-one connections, so that the "firing" or conduction in the emitter-base-one circuit occurs at a fixed percentage of the supply voltage. If the supply voltage or negative battery fluctuates, the voltage appearing across resistor 95 to energize transistor 47 similarly varies. However, timing pulse source 90 is energized from the same battery, and thus there is a concomitant variation in the amplitude of the pulses in waveform 88 produced by timing pulse source 90, which minimizes the net variation in circuit operation. In a preferred embodiment, with the timing set for 30 seconds, reduction of negative battery from −48 volts to −24 volts reduced the timing by about one second. Using a single timing pulse source, the connection of a 500-ohm load to such source, which is the equivalent of a load of several hundred trunks, reduced the timing by a similar amount, about one second in thirty. Thus a single timing pulse source (for example, the one indicated in FIGURE 3) can supply a very large number of individual trunks, with minimum variation in the dialing time afforded thereby as the voltage level fluctuates over a considerable range of values.

Although the timing circuit disclosed herein includes a dicharge circuit for measuring the desired time period as the pulses from the source beat against the charged capacitor, it will be apparent that the same concepts may be practiced in the use of a charging circuit to charge a capacitor until such time as a predetermined potential value is reached, the period of charging providing the desired measured time interval.

D. *Timing pulse source*

Figure 3:
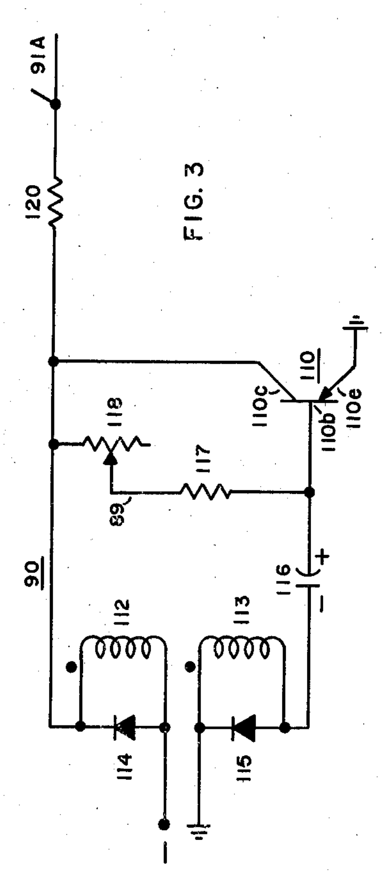
FIGURE 3 is a schematic diagram of a novel source of timing pulses suitable for use with the invention.

The purpose of source 90, shown in detail in FIGURE 3, is to produce positive-going pulses of substantially constant amplitude and time duration during time T, thus completing the discharge path for capacitor 94. Regulation of the discharge rate is accomplished by varying the time interval between pulses which varies the pulse ratio between pulse on and pulse off.

In more detail, source 90 comprises a PNP type transistor 110 having emitter, base and collector electrodes *e*, *b* and *c*; a transformer 111 having a primary winding 112 and a secondary winding 113 connected to battery and ground respectively, with diodes 114 and 115 respectively connected across the windings to protect the transistor against transient voltages developed in the transformer; a capacitor 116 connected between the end opposite ground of the secondary winding 113 and the base 110*b*; a conductor connecting the end of the primary winding 112 opposite battery to the collector 110*c*; a series circuit comprising a fixed resistor 117 and a variable resistor 118 having a movable arm 89, connected between base 110*b* and collector 110*c*; a conductor connecting the emitter 110*e* to ground; and an output resistor 120 coupled to collector 110*c*. The windings 112 and 113 are poled as shown. The circuit of source 90 is essentially a blocking oscillator, and it has been found that a twin-wound relay coil can be utilized as transformer 111.

Assuming initially that transistor 110 is conducting, the effective impedance exhibited by the transistor is low and nearly the full battery potential appears across primary winding 112. As current flows through winding 112, the voltage induced in secondary winding 113 is of the proper polarity to produce base current and maintain the transistor conducting. As capacitor 116 charges, base current decreases. When the level of the base current falls below that required to maintain the transistor saturated, the collector current starts to decrease, the field maintained by current flow through primary winding 112 collapses, and the induced voltage in secondary winding 113 shrinks to zero. The voltage appearing across capacitor 116 back biases the base-emitter circuit 110*b*, 110*e*, and transistor 110 is cut off. The transistor cannot again conduct until capacitor 116 discharges over the effective resistance of resistor 118 and over resistor 117. Capacitor 116 discharges, base current again commences to flow, and the transistor turns back on abruptly.

The waveform produced by the alternate conduction and cut-off of the transistor is represented by numeral 88 in FIGURE 2. With the transistor non-conductive at time $t_0$, the voltage applied to its collector approaches that of negative battery. As the transistor is rendered conductive at time $t_0$, its collector voltage rapidly approaches that of ground or positive battery, where it remains during the conductive time interval T between $t_0$ and $t_1$. At time $t_1$, the electromagnetic fields collapse as described and the charge accumulated across capacitor 116 back-biases the transistor, causing the collector voltage to again approach the level of negative battery, where it remains between times $t_1$ and $t_2$, until the capacitor discharges over variable resistor 118 and resistor 117. In a constructed embodiment, the time T was fairly constant, at about 13 milliseconds, and the off time or interval between $t_1$ and $t_2$ was variable from 16 to 135 milliseconds, thus providing a repetition rate variable over a range from approximately 7 to 35 pulses per second by adjustment of the position of arm 89 of variable resistor 118. Circuit values utilized in attaining these time intervals are set out at the end of the specification.

E. *Release of equipment*

In an attempt to avoid the protective limitations of the novel timing circuit, certain subscribers may jiggle the hook in an attempt to release the city connection without releasing the automatic trunk, and then initiate another call over the automatic trunk. The manner in which the novel trunk adapter prevents such undesired operation will now be described.

Equipment release is controlled by release control relay 37 and cut-off relay 52. Relay 37 is just slow enough to hold during dial pulses, is faster to release than the slow release relay in the city exchange, whereas cut-off relay 52 is considerably slower. If the subscriber hangs up or jiggles the hook for a time period sufficient to release control relay 37, such relay at its contacts 41*b* couples ground potential to the base 36*b* of transistor 36 to block the transistor and thereby prevent reoperation of release control relay 37 by the calling station before cut-off relay 52 has sufficient time to restore, the circuit of cut-off relay 52 being open at contacts 41*a*. The release of relay 52 at its contacts 53*a* release the P.B.X selector. Without such protection a subscriber may jiggle his hook to effect release of the city trunk and release control relay 37, and recomplete the circuit for the release control relay 37 before the cut-off relay 52 restores, whereby the connection may land in a different link in the city exchange, enabling the dialing of a restricted office. By the arrangements of this invention a calling party cannot complete an unauthorized call by jiggling the hook to release the city connection without releasing the trunk. In the present arrangement the trunk is not free to accept another call until the P.B.X selector has been released by relay 52, relay 52 being sufficiently slow to insure that the city exchange connection has been reelased before another call can be presented to it.

SUMMARY

The novel trunk adapter includes a transistorized dialing circuit which picks off the dial pulses from the line wtihout the necessity of inserting blocking condensers and battery feed relays to repeat the dial pulses in the trunk. The adapter further comprises a novel timing circuit including a unijunction transistor which in effect sets a limit on dialing time, thereby preventing unauthorized dialing by a subscriber after an unanswered call has timed out at the city, after the city has timed out when the dialing has not been completed, or after the city connection has been released by the called party. It is especially noted that the time interval in all the trunks, after being initially adjusted for the same time period by variation of the effective value of resistor 91 in the timing circuit, can be conveniently and readily adjusted by a common control in the timing pulse source 90, thus avoiding the labor of adjusting each trunk individually. A fairly brief disconnection effected by the calling party, as by jiggling the switch-hook, initiates trunk release, but the P.B.X switching equipment is not released until after an additional time interval sufficient to ensure that the city connection will be released before the trunk is free to accept another call from the P.B.X station.

To assist those skilled in the art in practicing the invention, a list of component types and values is set forth below. It will be understood that the exemplary values are given by way of explanation and illustration only, and in no sense by way of limitation.

COMPONENT TYPES AND VALUES

| Transistor: | Type |
|---|---|
| 34 | 2N1372 |
| 35 | 2N1372 |
| 36 | 2N398 |
| 47 | 2N1671B |
| 110 | 2N1183B |

| Diode: | Type |
|---|---|
| 77, 81, 93, 114, 115 | 1N2069 |

| Relay: | | Winding resistance |
|---|---|---|
| 26a | ohms | 10 |
| 26b | do | 1K |
| 37 | do | 400 |
| 43 | do | 200 |
| 48 | do | 200 |
| 52 | do | 750 |
| 112 | do | 1K |
| 113 | do | 150 |

| Resistor: | | Value |
|---|---|---|
| 57 | ohms | 1K |
| 58 | do | 1K |
| 76 | do | 47K |
| 78 | do | 47K |
| 80 | do | 4.7K |
| 82 | do | 150K |
| 92 | do | 100K |
| 95 | do | 3.3K |
| 96 | do | 1K |
| 117 | do | 4.7K |
| 120 | do | 100 |

| Variable resistor: | | Value |
|---|---|---|
| 91 | ohms | 250K |
| 118 | do | 25K |

| Capacitor: | Microfarads |
|---|---|
| 63 | 1 |
| 64 | 1 |
| 94 | 25 |
| 99 | 1 |
| 116 | 25 |

While only a particular embodiment of the invention has been disclosed and claimed, it is apparent that modifications and alterations may be made therein, and it is intended in the appended claims to cover all such modifications and alterations as may fall within the true spirit and scope of the invention.

What is claimed is:

1. In an automatic telephone system including a private branch exchange for extending connections between stations in the exchange and a trunk circuit having a direct current communication path, a first switching means operative to seize said trunk circuit and extend a connection over a calling loop from a calling station to said path, a second switching means including said trunk circuit operative responsive to extension of a connection over said first switching means to said path from one of said stations to extend said path toward a second exchange, and means in said trunk circuit including a first switching means automatically operative to release said trunk a predetermined period after interruption of said calling loop at said station, and a second means for maintaining said first switching means operative to effect said release even if the calling loop is re-established from said station to the trunk circuit during said delay period.

2. In an automatic telephone system including a private branch exchange for extending connections between stations in the exchange and a trunk circuit having a direct current communication path, selector means in said private branch exchange operative to extend a connection from a calling station to said path, switching means including dialing circuit means, cut-off relay means including path control means controlled by said cut-off relay means in said trunk circuit operative responsive to extension of a first connection over said selector means to said path from one of said stations to extend said path toward a second exchange, and means in said trunk circuit including said dialing circuit means and said cut-off relay means operative to release said trunk circuit a predetermined period after interruption of said first connection at said station, including means operative to hold said selector means during said period, and means operative to prevent interruption of said delayed release by said dialing circuit during said release period.

3. An automatic telephone system according to claim 2 in which said dialing circuit means comprises a transistor coupling circuit connected to operate in response to the transmission of signals over said path, a dialing circuit relay coupled to said transistor coupling circuit and operable thereby, said dialing circuit relay controlling said cut-off relay means, and means operative in response to transmission of said disconnect signal to said transistor coupling circuit to disable coupling of further signals by said transistor coupling circuit to said dialing circuit relay prior to release of said cut-off relay means by said dialing circuit relay.

4. In an automatic telephone system including a private branch exchange for extending connections between stations in the exchange and a trunk circuit having a direct current communication path, selector means in said private branch exchange operative to extend a connection from a calling station to said path, switching means including dialing circuit means comprising a dialing circuit relay operative to release in a preassigned time period, cut-off relay means operative to release in a given time period which is of a duration greater than said preassigned release time period by a predetermined time interval, and path control means controlled by said cut-off relay means in said trunk circuit operative responsive to extension of a connection over said selector means to said path from one of said stations to extend said path toward a second exchange, and means in said trunk circuit including said dialing circuit means and said cut-off relay means operative in response to a disconnect signal at said station including means operative to hold said selector means during said predetermined time interval and means simultaneously operative to prevent operation of said dialing circuit relay prior to the expiration of said predetermined time interval.

5. In an automatic telephone system including a private branch exchange for extending connections between at least one of the stations served by said private branch exchange and at least one allowed office, a trunk circuit having a first metallic communication path, selector means in said private branch exchange operative to extend a first connection from said calling station to said first path to seize said trunk circuit, restrictor means engageable by said trunk circuit for examining call-routing digits as received from said calling station, means responsive to engagement of said restrictor to establish a second connection between said first metallic path and a second metallic communication path in the extension of a call, means in said restrictor means for providing a control signal responsive to receipt of call-routing digits which identify a disallowed office, switching means including said restrictor means and said trunk circuit operative responsive to provision of said control signal by said restrictor means to disengage said second connection, and means in said trunk circuit including means operative responsive to provision of a disconnect signal by said station to initiate a delayed release of said trunk circuit, and a second means operative to prevent interruption of said release even with re-establishment of the calling loop from said station to the trunk circuit during said delay period.

6. In an automatic telephone system including a trunk circuit having a communication conductor path over which call-routing impulses are transmitted in the establishment of a connection to one of a plurality of offices and over which speech signals are subsequently transmitted, a high-impedance circuit including a semiconductor unit in said trunk circuit coupled to said communication conductor path for receiving said call-routing impulses without unduly loading said communication path, a first signalling means coupled to said semiconductor unit operatively controlled by the call-routing impulses coupled over said semiconductor unit to produce switching signals related to said call-routing impulses, switching means including restrictor means for restricting the extension of calls to certain ones of said offices and permitting the extension of calls to others of said offices, output means coupled to said first signalling means for transmitting said switching signals to said switching means including said restrictor means, a second signalling means coupled to said semiconductor unit operative responsive to selection of said path including said trunk circuit to seize associated switching equipment including said restrictor means, means in said trunk circuit operated by said restrictor means to prevent further extension of the connection responsive to receipt of signals intended for extending the connection to one of said certain offices, and timing means operative upon the expiration of a predetermined interval following seizure of said switching means to prevent further use of the trunk in the establishment of a communication connection.

7. In an automatic telephone system including a private branch exchange having a trunk including a communication path for transmitting impulses and speech signals thereover, switching means including restrictor means for use in restricting calls over said path to certain offices and permitting the extension of calls to other offices, and timing means operative a predetermined time interval subsequent to the seizure of said switching means, the improvement comprising a trunk circuit including high impedance means for coupling said trunk circuit to said path, control means coupled to said high impedance means operative responsive to selection of the path including said trunk circuit to seize said switching means and said restrictor means, switching means in said timer circuit operatively controlled by said control means responsive to receipt of an impulse over said path after the expiration of said predetermined time interval, and means controlled by said switching means in said operation to block the further extension of a call over said path toward any of said offices.

8. An automatic telephone system as set forth in claim 7 which includes means in said timing means for adjusting same to interrupt a connection extended over said communication path at a time interval after selection of said switching means which time interval is less than the total time required to transmit signals to complete a first connection to a subscriber in one of said other offices, to release said first connection, and to transmit signals to complete a second connection to a subscriber in one of said certain offices.

9. In an automatic telephone system including a private branch exchange having at least one trunk including a communication path for transmitting impulse and speech signals thereover, a first switching means including restrictor means for use in restricting calls over said path to certain offices and permitting the extension of calls to other offices, and timing means operative after the expiration of a predetermined time interval to prevent the further extension of calls to any of said offices including calls already extended past said restrictor means, said timing means including a potential storage means, a source of timing pulses, means for coupling the timing pulses from said source to said potential storage means, a second switching means coupled to said storage means to operate responsive to adjustment of the value of the potential on said storage means to a predetermined value by said timing pulses, and cut-off control means coupled to said second switching means operative responsive to said operation of said second switching means to interrupt a connection previously established over said communication path.

10. An automatic telephone system as set forth in claim 9 in which said source of timing pulses includes means for adjusting the on-off ratio of the pulse output signals to vary the allotted dialing time for each of the trunks in the system which are controlled thereby.

11. In an automatic telephone system including a private branch exchange having at least one trunk including a communication path for transmitting impulse and speech signals thereover, a first switching means including restrictor means for use in restricting calls over said path to certain offices and permitting the extension of calls to other offices, and timing means operative after the expiration of a predetermined time interval to prevent the extension of calls to any of said offices including calls already extended past said restrictor means, said timing means including a potential storage means, a source of timing pulses, means for coupling the timing pulses from said source to said potential storage means, a second switching means coupled to said storage means to operate responsive to adjustment of the value of the potential on said storage means to a predetermined value by said timing pulses, means for selecting the time of adjustment of the potential on said storage means, and cut-off control means coupled to said second switching means operative responsive to said operation of said second switching means to interrupt a connection previously completed over said communication path.

12. In an automatic telephone system, timer means for measuring a predetermined time period comprising potential storage means, a source of timing pulses including means for coupling said timing pulses to said potential storage means to vary the value of the potential stored therein by an amount directly related to the duration of each of the pulses applied to said potential storage means, means for rendering effective the application of said timing pulses to said potential storage means to reference the initiation of said predetermined time period, and switching means operable in response to the variation of said potential to a predetermined value to terminate the measured time period, the duration of the applied pulses thereby determining the length of said measured time period.

13. An automatic telephone system as set forth in claim 12 in which said source of timing pulses comprises a transistor having base, emitter and collector elements, a transformer having primary and secondary windings, each winding having first and second terminals, means for applying an energizing potential of given polarity to one terminal of said primary winding and over said primary winding to said collector, means for applying an energizing potential of a polarity opposite said given polarity to said emitter and to one terminal of said secondary winding, means including a capacitor coupled between the other of said terminals of said secondary winding and said base of the transistor, and variable resistance means coupled between said collector and the common connection of said base and said capacitor, adjustment of said variable resistance means being effective to correspondingly regulate the duration of the pulse output signals from said pulse source.

14. In an automatic telephone system including a private branch exchange having a trunk including a communication path for transmitting impulses and speech signals thereover, switching means including restrictor means for use in restricting calls over said path to certain offices and permitting the extension of calls to other offices, and timing means operative after the expiration of a predetermined time interval to prevent the extension of calls to any of said offices including calls already extended past said restrictor means, said timing means including a potential storage means, a unijunction transistor, an RC discharge circuit including said potential storage means coupled to said unijunction transistor to regulate a predetermined time period at the end of which said transistor becomes conductive, a source of timing pulses coupled to said RC discharge circuit for selectively completing a discharge path therefor including adjusting means for varying the ratio of the pulses provided and thus varying the effective discharge rate of said RC circuit to regulate the effective duration of said predetermined time period, and a timing relay coupled to said unijunction transistor operative at the end of said predetermined time period to effect interruption of said communication path.

15. In an automatic telephone system including a private branch exchange having a trunk including a communication path for transmitting impulses and speech signals thereover, switching means including restrictor means for use in restricting calls over said path to certain offices and permitting the extension of calls to other offices, and timing means operative after the expiration of a predetermined time interval to prevent the extension of calls to any of said offices including calls already extended past said restrictor means, said timing means including a potential storage means, a source of timing pulses, means for coupling said timing pulses to said potential storage means, semiconductor means coupled to said potential storage means connected to conduct responsive to adjustment of the potential on said storage means to a predetermined value, means including said semiconductor means for controlling the time at which the coupling of said pulses to said potential storage means is effective, adjustable means for regulating the rate of change of the potential on said storage means and correspondingly varying the duration of said predetermined time interval, and control means coupled to said semiconductor means operative responsive to conduction by said semiconductor means after said time interval to interrupt said communication path.

16. In an automobile telephone system including a communication conductor path over which direct current call-routing impulses are transmitted in the establishment of a connection and over which the speech signals are subsequently transmitted, a high-impedance circuit coupled to said communication path including at least one semiconductor unit coupled to said path for operation from a first stable state to a second stable state responsive to transmission of a direct current impulse over said communication path, control means including a dialing relay coupled to said high-impedance circuit operatively controlled to produce a switching signal as said semiconductor unit is operated from said first to said second state, and output means coupled to said control means for transmitting each switching signal to associated equipment.

17. An automatic telephone system as set forth in claim 16 which includes protective devices connected in said high impedance circuit to prevent application of line voltages of excessive values to the semiconductor units of the high impedance circuit.

18. An automatic telephone system according to claim 16 in which said conductor path includes a first and a second conductor and said high-impedance circuit comprises three transistors each having emitter, base, and collector elements, means for applying bias potentials to the respective emitters of said transistors, means for applying operating potentials to the respective collectors of said transistors, means for coupling one of said conductors to the base of said first transistor, means for coupling the collector of said first transistor to the base of said second transistor, to the collector of said third transistor, and to the other of said conductors, means for coupling the collector of said second transistor to the base of said third transistor, and means for coupling the collector of said third transistor to said dialing relay, whereby the output signals from said high impedance circuit are effective to operate said dialing relay in the production of said switching signals for transmission over said output means.

19. In an automatic telephone system including timing means for timing connections established over said system, said timing means including a potential storage means, semiconductor means, an RC discharge circuit including said potential storage means coupled to said semiconductor means to measure a predetermined time period at the end of which said semiconductor becomes conductive, a source of timing pulses coupled to said RC discharge circuit to selectively complete a discharge path therefor including adjusting means for varying the ratio of the pulses provided to thus vary the effective discharge rate of said RC circuit and the effective duration of said predetermined time period, and switching means coupled to said semiconductor means to operate at the end of said predetermined time period.

References Cited by the Examiner

UNITED STATES PATENTS

| | | | |
|---|---|---|---|
| 1,713,564 | 5/29 | Stazak | 179—42 |
| 2,837,663 | 6/58 | Walz | 307—88.5 |
| 2,848,613 | 8/58 | Green | 307—88.5 |
| 2,972,066 | 2/61 | Riley | 307—88.5 |

OTHER REFERENCES

Publication: Trenholm and Greenberg, "Unijunction Transistor Time Delay Relay," RCA Technical Note #377, June 1960.

ROBERT H. ROSE, *Primary Examiner.*

WALTER L. LYNDE, *Examiner.*